US012766713B2

(12) United States Patent
Kristensen

(10) Patent No.: US 12,766,713 B2
(45) Date of Patent: Oct. 20, 2026

(54) METHOD FOR OPERATING A MATERIAL HANDLING APPARATUS

(71) Applicant: KÖRBER SUPPLY CHAIN DK A/S, Arden (DK)

(72) Inventor: Jan Kristensen, Arden (DK)

(73) Assignee: KÖRBER SUPPLY CHAIN DK A/S, Arden (DK)

( * ) Notice: Subject to any disclaimer, the term of this patent is extended or adjusted under 35 U.S.C. 154(b) by 103 days.

(21) Appl. No.: 18/842,071

(22) PCT Filed: Mar. 6, 2023

(86) PCT No.: PCT/EP2023/055537

§ 371 (c)(1),
(2) Date: Aug. 28, 2024

(87) PCT Pub. No.: WO2023/169971

PCT Pub. Date: Sep. 14, 2023

(65) Prior Publication Data

US 2025/0178191 A1 Jun. 5, 2025

(30) Foreign Application Priority Data

Mar. 7, 2022 (EP) .................................... 22160402

(51) Int. Cl.
*B25J 9/16* (2006.01)
*B25J 19/06* (2006.01)

(52) U.S. Cl.
CPC ............ *B25J 9/163* (2013.01); *B25J 9/1697* (2013.01); *B25J 19/06* (2013.01)

(58) Field of Classification Search
CPC ... B25J 9/06; B25J 9/163; B25J 9/1674; B25J 9/1697; B65G 43/02; B65G 61/00; G05B 2219/34451; G05B 2219/40532; G05B 2219/40577; G05B 2219/40607; G05B 23/0262; G06N 20/00; G06T 2207/10016; G06T 2207/20072; G06T 2207/20076;
(Continued)

(56) References Cited

U.S. PATENT DOCUMENTS 9,227,323 B1 * 1/2016 Konolige ................. B25J 9/163
10,984,378 B1 * 4/2021 Eckman ........... G06K 19/06131
(Continued)

FOREIGN PATENT DOCUMENTS

CN 113920339 A 1/2022
WO 0064790 A1 11/2000
(Continued)

*Primary Examiner* — Wade Miles
*Assistant Examiner* — Zachary Joseph Wallace
(74) *Attorney, Agent, or Firm* — Luedeka Neely, P.C.; Mark P. Crockett

(57) ABSTRACT

The present disclosure relates to a computer-implemented method for operating a material handling apparatus, comprising: while the material handling apparatus is performing a handling process, receiving an alert signal indicating an imminent interruption of the handling process; analyzing, using a machine-learning model, recorded image data of the handling process; determining, using the machine-learning model, that the alert signal is a false positive; and generating a control signal for instructing the material handling apparatus to continue the handling process.

14 Claims, 13 Drawing Sheets

(58) Field of Classification Search
CPC . G06T 2207/20081; G06T 2207/20084; G06T 7/0008
See application file for complete search history.

(56) References Cited

U.S. PATENT DOCUMENTS

| | | | | |
|---|---|---|---|---|
| 11,845,191 | B1 * | 12/2023 | Kuzhinjedathu | B23P 19/007 |
| 12,459,121 | B2 * | 11/2025 | Stoeffler | B25J 5/007 |
| 2019/0337152 | A1 | 11/2019 | Homberg et al. | |
| 2020/0189103 | A1 | 6/2020 | D'Ercoli et al. | |
| 2020/0388136 | A1 | 12/2020 | Kurata et al. | |
| 2021/0299873 | A1 | 9/2021 | Badiozamani et al. | |
| 2022/0203547 | A1 * | 6/2022 | Majumdar | G06T 7/73 |
| 2023/0071384 | A1 * | 3/2023 | Agarwal | B25J 19/023 |
| 2024/0096074 | A1 * | 3/2024 | Okorn | G06N 3/0455 |

FOREIGN PATENT DOCUMENTS

| | | | |
|---|---|---|---|
| WO | 2008019691 | A1 | 2/2008 |
| WO | 2010097088 | A1 | 9/2010 |
| WO | 2021062536 | A1 | 4/2021 |

* cited by examiner

METHOD FOR OPERATING A MATERIAL HANDLING APPARATUS

TECHNICAL FIELD

Embodiments described herein generally concern the field of industrial automation, and in particular the controlling of a material handling apparatus, e.g. a layer picker apparatus, based on machine-learning.

BACKGROUND

Material handling apparatuses are used worldwide in the handling of materials, especially goods. They enable efficient movement of goods, even heavy goods in large quantities, which human users would not be able to move or could only move with great effort. One example of such material handling apparatus is a layer picker, which is the world's leading machine for moving, i.e. picking, 97% of all goods that are arranged in layers, for example on pallets. Therefore, the layer picker is the predominant machine in industrial automation for palletizing and depalletizing goods which are arranged in layers. Layer pickers can be implemented in a variety of configurations and are commonly used for example in combination with robots, portal cranes or hoists. Technological background information about exemplary layer pickers may be found in WO 00/64790 A1, WO 2008/019691 A1 and WO 2010/097088 A1.

Despite the already widespread use of material handling apparatuses, in particular layer pickers, and the high level of technological development, inefficiencies can occur during the handling of material. Such inefficiencies may for example result from an alarm signal or drop signal issued by the material handling apparatus and the associated reaction to stop the handling process. In such a case, a user must check the possible problem that led to the alarm signal, correct the problem or continue the process directly if it was a false positive alarm signal.

An alarm signal being a false positive may for example result from a part of a packaging material of handled items becoming detached or hanging down. For example, in the case of a layer picker, this portion of packaging material may be a slip sheet that inadvertently adheres to the bottom of the handled layer and partially hangs down. Such a portion of packaging material is detected by a light sensor and interpreted as possible dropping or imminent dropping of handled items. Often, however, a hanging down packaging material is not harmful and the handling process could actually continue. However, a user has to check the handling process and manually trigger continuation of the process and/or reset the material handling apparatus in order to facilitate continuation.

It is therefore a problem underlying the invention to increase the efficiency during material handling processes of material handling apparatuses and thereby overcome the above-mentioned disadvantages of existing material handling apparatuses, in particular layer pickers, at least in part.

SUMMARY

The problem is solved by the subject-matter defined in the independent claims. Advantageous modifications of embodiments described herein are defined in the dependent claims as well as in the description and the figures.

According to a first aspect of the present disclosure, a computer-implemented method for operating a material handling apparatus is provided. The method may comprise, while the material handling apparatus is performing a handling process, receiving an alert signal indicating an imminent interruption of the handling process. The method may comprise analyzing, using a machine-learning model, recorded image data of the handling process. The method may comprise determining, using the machine-learning model, that the alert signal is a false positive. The method may comprise generating a control signal for instructing the material handling apparatus to continue the handling process.

By implementing the proposed method according to the first aspect of the present disclosure, the efficiency of handling processes is increased. In particular, hot downtimes are reduced.

A material handling apparatus in the sense of the present disclosure may be any machine that may be used for moving, handling or processing raw materials, materials, items, products or goods. For example, a layer picker may be a material handling apparatus in the sense of the present disclosure. Further, cranes, Automatic Guided Vehicles (AGVs), Laser Guided Vehicles (LGVs), Rail Guided Vehicles (RGVs) and T-Cars may be material handling apparatuses in the sense of the present disclosure.

The term "while the material handling apparatus is performing a handling process" may for example be understood as a time period or a series of time periods in which a handling process is performed by the material handling apparatus. A time period may for example include the start of a handling process and include the end of a handling process. In that sense, the term "while" does not only mean during a movement, but also the beginning and the end of a material handling process at which no movement is performed by the material handling apparatus. In other words, the term "while the material handling apparatus is performing a handling process" may be understood independently from an actual movement of the material handling apparatus.

An alert signal may for example be an electronic signal which may be processed by a controller of the material handling apparatus, in particular to interrupt a handling process due to possible security issues. Triggering the alert signal may for example be performed by means of a light sensor as commonly used in industrial automation processes, in particular for operating layer pickers.

It is self-evident that the method may comprise, prior to the step of analyzing, recording of the image data. The image data may be recorded by means of at least one camera. It is particularly preferred that the image data is recorded by means of at least two, preferably three, preferably four cameras. A higher number of cameras may increase the accuracy of the method. In particular, the four cameras may be arranged in corners of a square around the material handling apparatus to observe the handling process.

The image data may be a video sequence, a video stream, in particular in real-time, and/or a sequence of still images. If more than one camera is used to record the image data, synchronization of the image data of the different cameras is preferably performed.

Machine learning may refer to algorithms and statistical models that computer systems may use to perform a specific task without using explicit instructions, instead relying on models and inference. For example, in machine-learning, instead of a rule-based transformation of data, a transformation of data may be used that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model “learns” to recognize the content of the images, so the content of images that are not included in the training data can be recognized using the machine-learning model. The same principle may be used for other kinds of sensor data as well: By training a machine-learning model using training sensor data and a desired output, the machine-learning model “learns” a transformation between the sensor data and the output, which can be used to provide an output based on non-training sensor data provided to the machine-learning model. The provided data (e.g., sensor data, meta data and/or image data) may be preprocessed to obtain a feature vector, which is used as input to the machine-learning model.

In some examples, anomaly detection (i.e., outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g., a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term “machine-learning algorithm” may denote a set of instructions that may be used to create, train or use a machine-learning model. The term “machine-learning model” may denote a data structure and/or set of rules that represents the learned knowledge (e.g., based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g., of the sum of its inputs). The inputs of a node may be used in the function based on a “weight” of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e., support vector networks) are supervised learning models with associated learning algorithms that may be used to analyze data (e.g., in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The machine-learning model may be provided locally, in particular in a controller of the material handling apparatus, and/or remotely, in particular on a remote server. An advantage of providing the machine-learning model locally is the reduced latency and the possibility to individualize the machine-learning model per material handling apparatus with less effort. An advantage of providing the machine-learning model remotely is that a remote server may have a higher computing power and that training datasets of a plurality of material handling apparatuses may be used for training the machine-learning model in order to obtain a higher accuracy of the machine-learning model. Thus, the remote server may be a cloud-based machine-learning environment. In one preferred embodiment, the machine-learning model is provided locally for controlling the material handling apparatus with reduced latency, and is provided remotely on a remote server where the machine-learning model is further trained using training data obtained from the material handling apparatus. The locally provided machine-learning model is updated regularly. In other words, when the remote machine-learning model is trained, the local machine-learning model is updated such that the local machine-learning model is synchronized with the remote machine-learning model. This way, continuous optimization of the machine-learning model is facilitated.

The machine-learning model may be trained by supervised machine learning according to the fourth aspect of the present disclosure as described below. The training dataset for training the machine-learning model may be obtained through a method according to the second aspect of the present disclosure, as described below.

The term “false positive” may be understood as follows: An alert signal may be a false positive in the sense of the present disclosure if, despite the alert signal, an interruption of the handling process is actually not necessary.

The term “continue” may be understood as a seamless continuation of the handling process on the one hand. On the other hand, in case of material handling apparatuses which require a reset if an alert signal occurs, “continue” may also include switching the material handling apparatus into a temporary stop mode that allows a seamless continuation of the handling process, in particular a reset of the material handling apparatus not being necessary, wherein the seamless continuation may for example be triggered by a user.

Therefore, by implementing the method according to the first aspect of the present disclosure, hot downtimes, i.e. idle times, may be reduced efficiently in order to save handling process costs and time. Further, the reliability of a material handling apparatus is increased with respect to security aspects.

The method may provide the possibility to process emergency user input causing an abortion of the method and interrupting the handling process and/or passing the control over the handling process, i.e. over the material handling apparatus, to the user such that the user may instruct the material handling apparatus with respect to the handling process. Such functionality can be understood as an additional safety precaution that allows a user to intervene in the decisions of the material handling apparatus at any time. If, for example, a material handling apparatus makes a decision that—as the user determines—requires an interruption of the handling process, the user can immediately trigger this interruption manually and overrule the decision of the material handling apparatus.

It may be provided that the image data comprises a sequence of still images, wherein the step of analyzing comprises selecting a subset of images. Optionally, the selected subset of images comprises images recorded at predetermined times before and/or after receiving an alert signal.

By selecting a subset of images, the amount of image data to be transferred and processed to the machine-learning model is reduced for the benefit of reduced latency. In particular, by appropriately selecting as many images as necessary to have a sufficient database for a reliable analysis by the machine-learning model, but as few images as possible to reduce processing time, an optimum is found between the accuracy of the analysis by the machine-learning model and the latency.

Optionally, the images comprise a unique identifier and/or a time stamp. Optionally, the alert signal may comprise a unique identifier and/or a time stamp. If the images and the alert signal comprise a unique identifier and/or a time stamp, it may be provided that the unique identifier(s) and or time stamp(s) are configured such that respective images can be univocally allocated to a respective alert signal.

Unique identifiers and/or time stamps facilitate documentation of a handling process, in particular of a failure in the handling process. A failure in the handling process may for example be a result of a packaging error of items to be handled by the material handling apparatus. For example, a packaging error can be seen in using too much packaging material or multiple layers of packaging material although only one is admissible before handling the items. A further example of a packaging error in the sense of the present disclosure may also be a packaging overhang that may in particular occur if items are to be handled which are packaged with plastic wrap or the like. Such a packaging overhang of packaging material can be present in particular if the packaging material is laterally torn open. For example, items on a pallet may be wrapped in packaging material and a packaging overhang may be present if the wrapping has not been carried out properly or the wrapping has been cut open at the side or not properly secured. This may cause an alert signal during a handling process.

Such a packaging error is usually to be accused to the supplier of the items, so that possible hot downtimes, i.e. idle times, or damages can be a possible recourse for the supplier. However, in order to take recourse against the supplier, careful documentation is required, which is made possible with the features mentioned. Univocal allocation of the images to one particular alert signal further facilitates accurate documentation.

Further, it may be provided that the image data comprises images recorded by at least two cameras, preferably four cameras. Optionally, the at least two cameras are synchronized with respect to the time at which the image data is recorded.

The benefit of using a plurality of cameras is that a higher accuracy of determining that the alert signal is a false positive is possible. In other words, the additional information provided by the use of multiple cameras, in particular the various image data from different angles and viewing directions, allows a precise statement to be made as to whether an interruption of the handling process is required or whether the handling process can be continued.

Synchronization of the cameras ensures that image data recorded at different times are not processed. This avoids errors in the assessment of a situation during a handling process.

The method may provide, in the step of determining that the alert signal is a false positive: generating sub-probabilities for the alert signal being a false positive per camera; and determining a combined probability for the alert signal being a false positive based on the sub-probabilities.

Generating the sub-probabilities may comprise weighting of recorded images. In particular, when the image data comprises a sequence of still images, wherein the step of analyzing comprises selecting a subset of images, and wherein the selected subset of images comprises images recorded at predetermined times before and/or after receiving the alert signal, it may be provided selected images recorded after the alarm signal are given a higher weighting than selected images recorded before the alarm signal. It is preferred that the weighting may increase successively from the first selected image to the last selected image.

Additionally or alternatively, determining a combined probability comprises averaging of the sub-probabilities and/or weighting of the sub-probabilities. Different sub-probabilities per camera may e.g. occur if respective camera (s) observe an area where an error, for example being a loose packaging material, is visible, while other camera(s) observe an area where the same error is not entirely visible. For example, in the case if four cameras are provided to observe the handling process, the highest sub-probabilities associated with the respective camera(s) may be given a higher weight than the lower sub-probabilities. Another possible example is that the combined probability is determined based on sub-probabilities excluding the lowest sub-probability. In particular, in the case if four cameras are provided, the second camera may have the lowest generated sub-probability. The determination of the combined probability may then be carried out based on the sub-probabilities associated with the first, third and fourth camera respectively.

Alternatively or additionally, weighting the sub-probabilities and/or determining the combined probability may be carried out using a second machine-learning model. The second machine-learning model may be configured to carry out the necessary operations on the probabilities.

Generating sub-probabilities and/or determining the combined probability may be performed using the machine-learning model. The use of sub-probabilities accounts for the fact that different cameras record different parts of a state during a handling process. It increases the precision of detection if each camera is initially treated separately, and corresponding sub-probabilities are determined for the actual presence of an error requiring interruption.

The sub-probabilities can be weighted as needed for the determination of the combined probability. For example, a camera that indicates a sub-probability of 0 for the presence of an error requiring interruption can be omitted from the calculation of the combined probability to increase precision and not degrade the result due to a viewing angle from which the situation is not properly visible. Additionally or alternatively, the recorded images may be weighted for the sake of increasing the precision of the method.

The method may comprise determining that the combined probability for the alert signal being a false positive is above a, preferably predetermined, first confidence threshold.

The method may comprise:

- if the combined probability is above a first confidence threshold and is above a second confidence threshold, generating a control signal for instructing the material handling apparatus to continue the handling process is performed; and/or
- if the combined probability is above the first confidence threshold but below the second confidence threshold, generating a control signal instructing the material handling apparatus to switch into a temporary stop mode that allows a seamless continuation of the handling process, preferably upon user input.

Using thresholds is a particularly easy way of deciding whether a calculated probability for an error requiring an interruption of the handling process in fact should result in an interruption or whether the handling process should be continued. The thresholds may be predefined or dynamically managed by the machine-learning model.

Using a first threshold and a second threshold allows to distinguish between different severity levels of errors and to trigger an optimal response of the material handling apparatus in each case. The second confidence threshold may be higher than the first confidence threshold, such that if the combined probability for the alert signal being a false positive is above the first confidence threshold but below the second confidence threshold, there could be a more serious error that requires a check by a user in order to be on the safe side.

It may be provided that the alert signal comprises a unique identifier and/or a time stamp. Unique identifiers and/or time stamps facilitate documentation of a handling process, in particular of a failure in the handling process, as described above.

According to a second aspect of the present disclosure, a computer-implemented method for generating training data for a machine-learning model for controlling a material handling apparatus is provided. The method may comprise, while the material handling apparatus is performing a handling process, receiving an alert signal indicating an imminent interruption of the handling process. The method may comprise receiving user input from a user indicating a reaction to the alert signal. The method may comprise obtaining recorded image data of the handling process. The method may comprise generating a training dataset comprising the user input and the image data.

The machine-learning model may be provided locally, in particular in a controller of the material handling apparatus, and/or remotely, in particular on a remote server. For the actual control of the material handling apparatus, a local machine-learning model is beneficial due to the reduced latency. The training of the machine-learning model can then also be performed locally, but during training, an operation may be not possible, and the computing power limited.

Providing the machine-learning model remotely has the benefit that a remote server may have a higher computing power and that training datasets of a plurality of material handling apparatuses may be used for training the machine-learning model in order to obtain a higher accuracy of the machine-learning model. Thus, the remote server may be a cloud-based machine-learning environment.

Therefore, it is preferred that the machine-learning model is provided locally for controlling the material handling apparatus with reduced latency, and is provided remotely on a remote server where the machine-learning model is further trained by the method according to the second aspect of the present disclosure. The locally provided machine-learning model may be updated regularly. In other words: When the remote machine-learning model is trained, the local machine-learning model is updated such that the local machine-learning model is synchronized with the remote machine-learning model. By this, continuous optimization of the machine-learning model is facilitated.

Training data in the sense of the present disclosure may include obtained image data from at least one camera, as described with respect to the first aspect of the present disclosure. The image data may also include a unique identifier and/or a time stamp as described above. Further, the training data may include user input, for example indicating that the material handling process can be continued. The user input may also comprise a unique identifier and/or a time stamp in order to precisely allocate the user input to the obtained image data. The image data and the user input may comprise further meta data, such as temperature, light conditions and/or identity of the user in charge of the handling process and/or the like. Further, the alert signal may be part of the training data. The alert signal may also comprise a unique identifier and/or a time stamp for the sake of allocation.

The user input may indicate that a current situation during a handling process should not lead to an interruption, e. g. by instructing the material handling apparatus to continue the handling process for example in a time period being shorter than a time period threshold. On the other hand, a user input may indicate that an interruption of the handling process was indeed necessary, e. g. by performing a reset of the material handling apparatus or by continuing the handling process after a time period extending a time period threshold.

By receiving the user input, the corresponding image data is classified. This classification can be seen as supervised machine-learning. In one scene of a handling process visible on the image data is classified to allow a continuation of the handling process irrespective of an occurring alert signal, similar scenes will be then also classified respectively by the trained machine-learning model. In other words: The machine-learning model is trained by the decision of a user in respective situations, in particular in reaction to an alert signal, during a handling process.

It may be provided that the user input comprises at least one of the following: an instruction to continue the handling process and/or to disregard the alert signal; an instruction to reset the material handling apparatus; an instruction to switch the material handling apparatus into a manual control mode allowing the user to manually control the material handling apparatus; opening a safety barrier surrounding the material handling apparatus.

For data protection purposes, e.g. in accordance with GDPR or other regulations, it may be provided that only strictly relevant technical information is used. Therefore, it may be provided one or more of the following: recorded images are cropped before they are stored on any media to only record the material to be handled; image data is only streamed and not recorded; no sound is recorded; all cameras are in a fixed positions and have no zoom functionality; all cameras are physically connected with a cable and not communicating wirelessly; all processing devices such as controllers and the like are physically connected to the network and not wirelessly; all processing of the data that has the potential to contain persons takes place locally and does not leave the premise before the negative validation of the existence of a person has been performed, and the images with persons are deleted.

It may be provided that if the user input comprises manually controlling the material handling apparatus and/or if the user input comprises opening the safety barrier surrounding the material handling apparatus, the respective user input and image data is excluded from the training dataset. This data may nevertheless be stored and labeled, for example as "interruption necessary", but the data may be manually reviewed in terms of supervised machine learning before being included in the training dataset.

By excluding user input under specific circumstances, it is avoided that the quality of the training data is affected by extraordinary actions by the user. For example, an extraordinary action could be testing the material handling apparatus or demonstrating a specific handling process for training purposes.

According to a third aspect of the present disclosure, a machine-learning training dataset is provided, the machine-learning training dataset being obtained by a method for generating training data for a machine-learning model according to the second aspect of the present disclosure.

According to a fourth aspect of the present disclosure, a computer-implemented method of training a machine-learning model for operating a material handling apparatus is provided. The method may comprise transmitting a training dataset, preferably a plurality of training datasets, in particular according to the third aspect of the present disclosure, to a cloud-based machine-learning environment. The preferred plurality of training datasets are optionally training datasets associated with a plurality of material handling apparatuses. The method may comprise receiving a trained machine-learning model. The machine-learning model is preferably in a binary format.

In other words, it may be provided a locally stored machine-learning model at the material handling apparatus and a remotely stored machine-learning model in the cloud-based machine-learning environment. The training of the machine-learning model may be performed in the cloud-based machine-learning environment. The locally stored machine-learning model is regularly updated such that it is synchronized with the remotely stored machine-learning model. Thus, the locally stored machine-learning model is used for controlling the material handling apparatus, while the remotely stored machine-learning model is used for further training and optimizing of the machine-learning model. Providing the machine-learning model in a binary format is advantageous with respect to the amount of data to be provided.

Machine-learning models may be trained using training input data, as described above. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g., a classification algorithm, a regression algorithm or a similarity learning algorithm). Classification algorithms may be used when the outputs are restricted to a limited set of values (categorical variables), i.e., the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied, and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (predefined) similarity criteria, while being dissimilar to input values that are included in other clusters. Reinforcement learning is a third group of machine-learning algorithms that may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

According to a fifth aspect of the present disclosure, a data processing apparatus, preferably a material handling apparatus, is provided. It may comprise means for carrying out a method according to the first, second and/or fourth aspect of the present disclosure.

The data processing apparatus may comprise means for carrying out a method according to the first aspect of the present disclosure, and may be a layer picker comprising two, preferably three, preferably four cameras. The cameras may be synchronized with respect to the time at which the image data is recorded. The step of analyzing may comprise selecting a subset of images being recorded at predetermined times before and/or after receiving an alert signal.

According to a sixth aspect of the present disclosure, a computer program is provided, comprising instructions which, when the program is executed by a computer, cause the computer to carry out a method according to the first, second and/or fourth aspect of the present disclosure.

All technical implementation details and advantages described with respect to any of the first, second, third, fourth, fifth and sixth aspects of the present disclosure, are self-evidently mutatis mutandis applicable respectively to each of the aspects of the present disclosure.

Apart from the above-mentioned benefits, embodiments of the described herein may further provide at least some of the following additional benefits:

- More production time because of less stop time;
- Less need of an operator as the machine resets automatically;
- Fewer wrong decisions as the operator has a live view;
- Investigation tools where video together with data can support what happened; and
- Supply visual data with reports to suppliers together with data for downtime.

Some embodiments described herein provide a data carrier having electronically readable control signals, which are capable of cooperating with a programmable computer system, such that one of the methods described herein is performed.

Generally, embodiments described herein can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present disclosure is, therefore, a computer program having a program code for performing one of the methods described herein, when the computer program runs on a computer.

A further embodiment described herein provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present disclosure is an apparatus as described herein comprising a processor and the storage medium.

A further embodiment described herein provides a data stream or a sequence of signals representing the computer program for performing one of the methods described herein. The data stream or the sequence of signals may, for example, be configured to be transferred via a data communication connection, for example, via the internet.

A further embodiment described herein provides a processing means, for example, a computer or a programmable logic device, configured to, or adapted to, perform one of the methods described herein.

A further embodiment described herein provides a computer having installed thereon the computer program for performing one of the methods described herein.

A further embodiment described herein provides an apparatus or a system configured to transfer (e.g., electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein.

Generally, the methods are preferably performed by any hardware apparatus.

BRIEF DESCRIPTION OF THE DRAWINGS

The disclosure may be better understood by reference to the following drawings.

DESCRIPTION OF PREFERRED EMBODIMENTS

Figure 1:
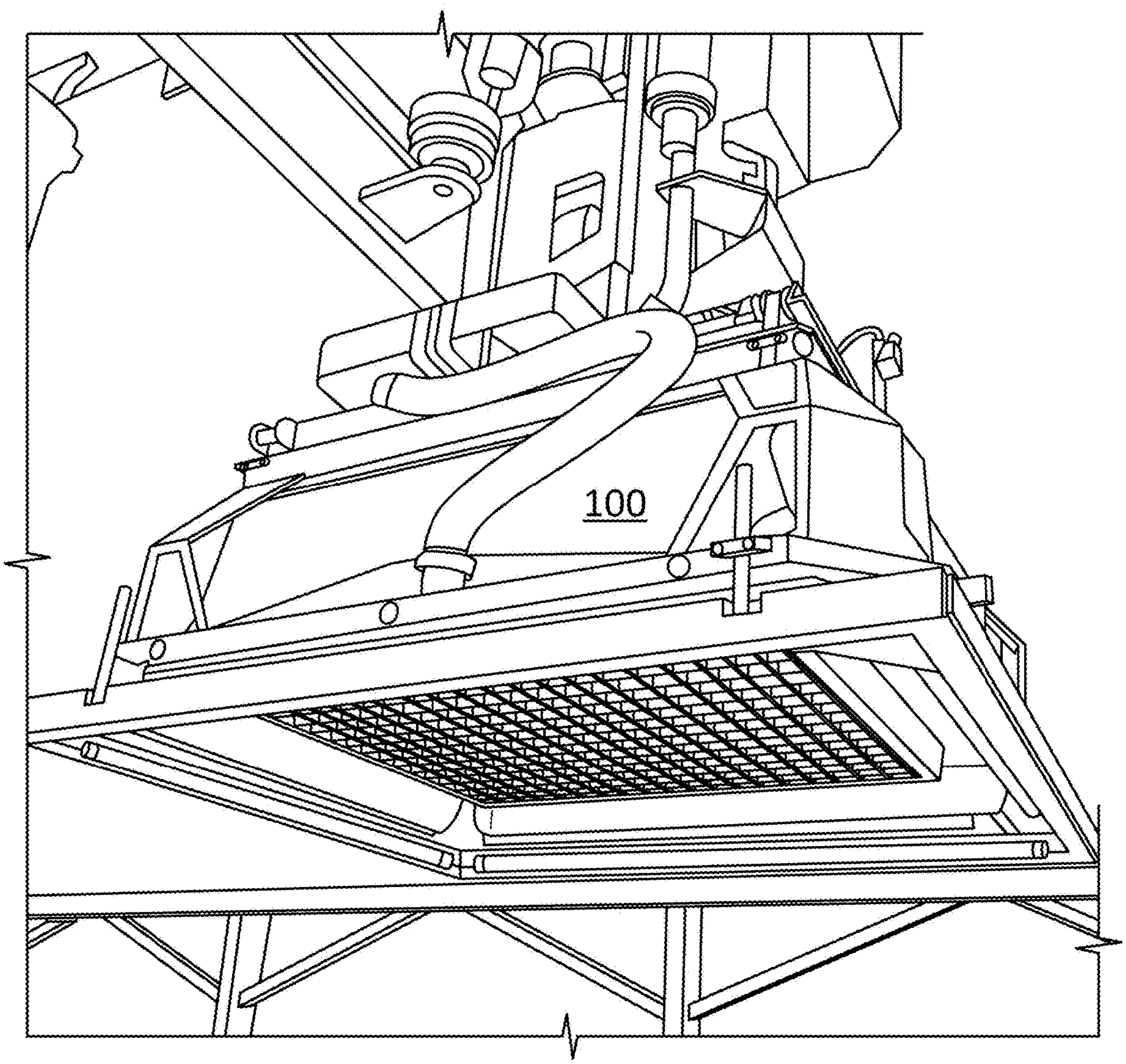
FIG. 1 is a first photo of a layer picker which is a material handling apparatus in accordance with embodiments of the present disclosure.

In FIG. 1, a layer picker being a material handling apparatus 100 according to embodiments of the present disclosure is shown. The layer picker of FIG. 1 has a vacuum gripper and may be used to palletize and/or de-palletize material, e. g. items or goods.

Figure 2:
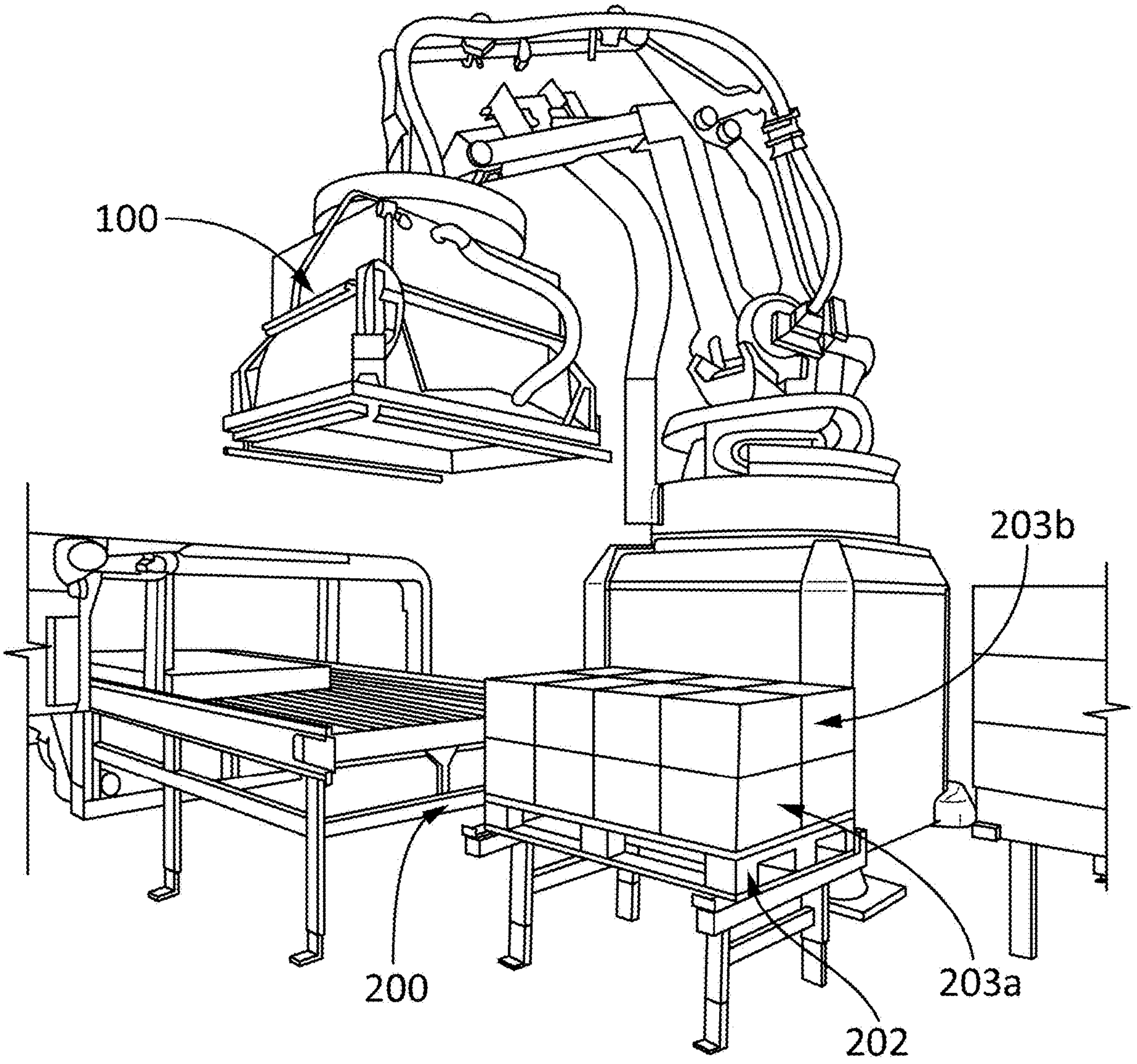
FIG. 2 is a second photo of a layer picker which is a material handling apparatus, together with a pallet with items and a conveyor, in accordance with embodiments of the present disclosure.

Also, FIG. 2 shows a layer picker being a material handling apparatus 100 according to embodiments of the present disclosure. The layer picker is in this case mounted together with a crane. Further, a plurality of layers 203*a*, 203*b* of material 200 is illustrated being placed on a pallet 202.

Figure 3:
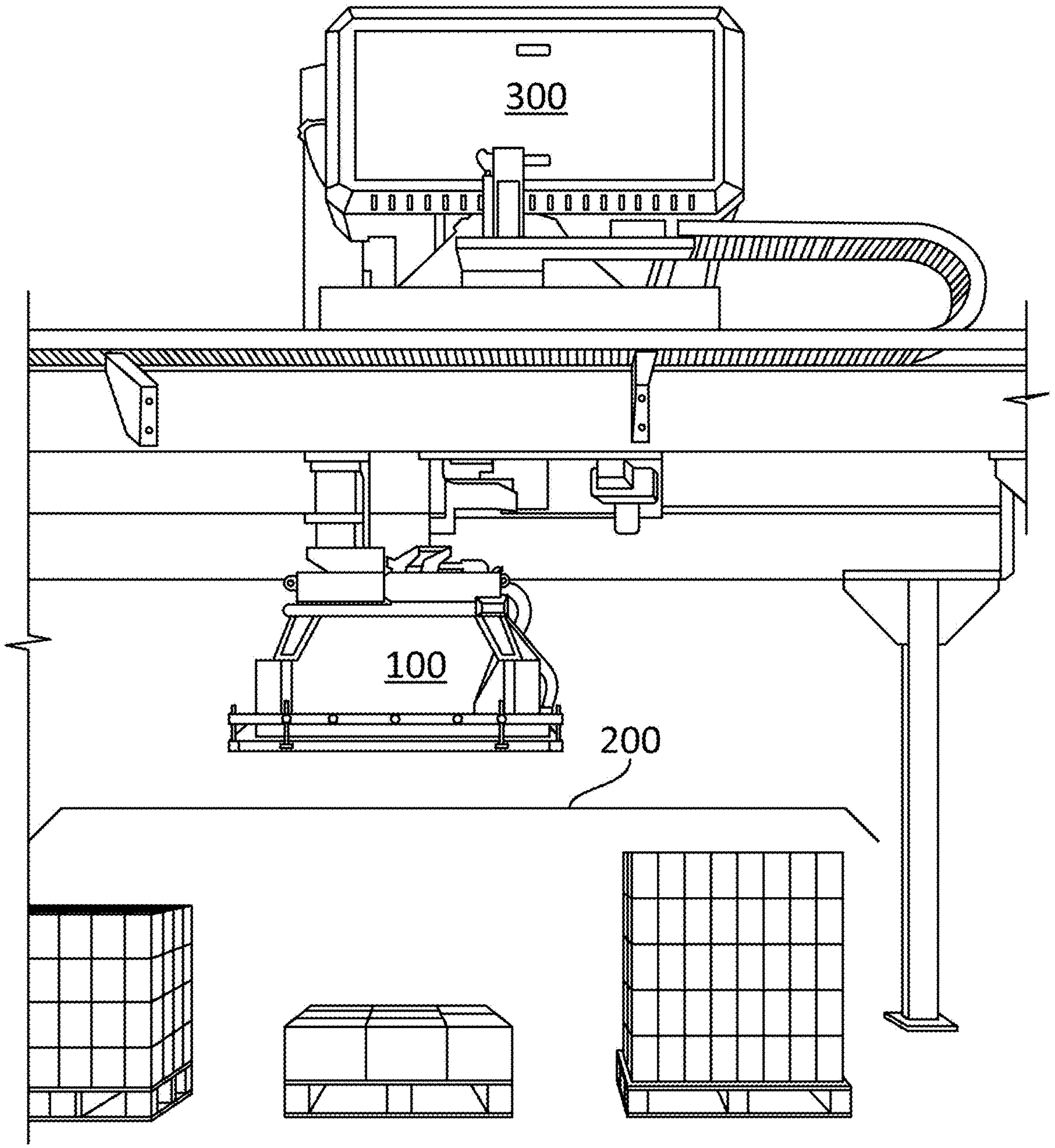
FIG. 3 is a third photo of a layer picker which is a material handling apparatus, together with a hoist crane, in accordance with embodiments of the present disclosure.

FIG. 3 shows a layer picker being a material handling apparatus 100 being configured as a part of a hoist crane 300. Further, material 200 to be handled is illustrated.

Figure 4:
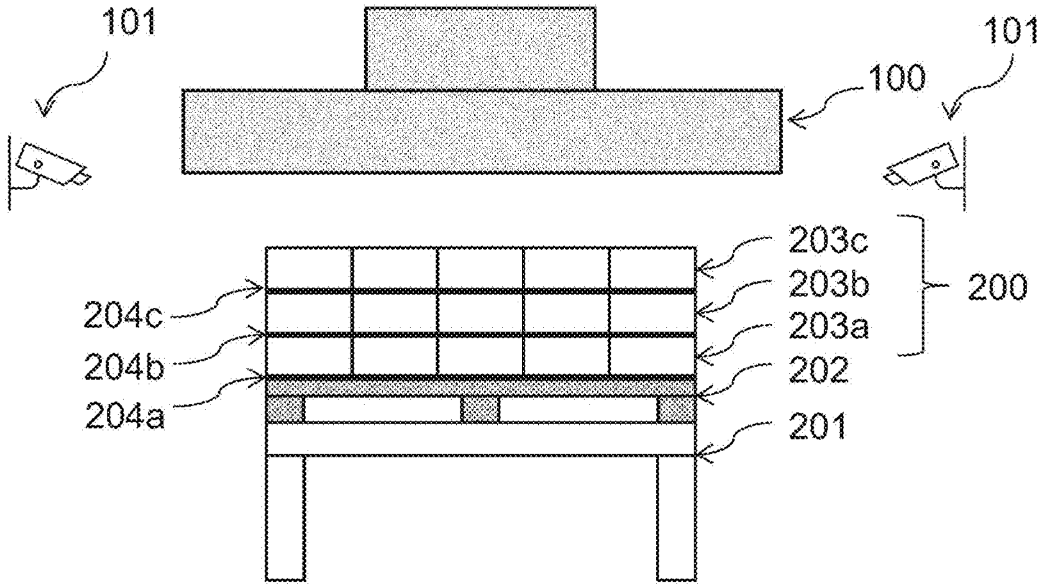
FIG. 4 is a schematic illustration of a material handling apparatus which is about to handle layered items in accordance with embodiments of the present disclosure.

FIG. 4 is a highly schematic illustration of a material handling apparatus 100 which is about to start a material handling process with respect to layers 203*a*, 203*b*, 203*c* of material 200. Each layer of the material 200 comprises a packaging material 204*a*, 204*b*, 204*c*. In the illustration of FIG. 4, the packaging materials 204*a*, 204*b*, 204*c* are slip sheets between the layers 203*a*, 203*b*, 203*c* of material 200. The layers 203*a*, 203*b*, 203*c* of material 200 are placed on a pallet 202 and the pallet 202 is placed on a schematically illustrated conveyor 201. The material handling process, i.e. the handling of a layer 203*a*, 203*b*, 203*c* of material 200 may be observed by cameras 101.

Figure 5:
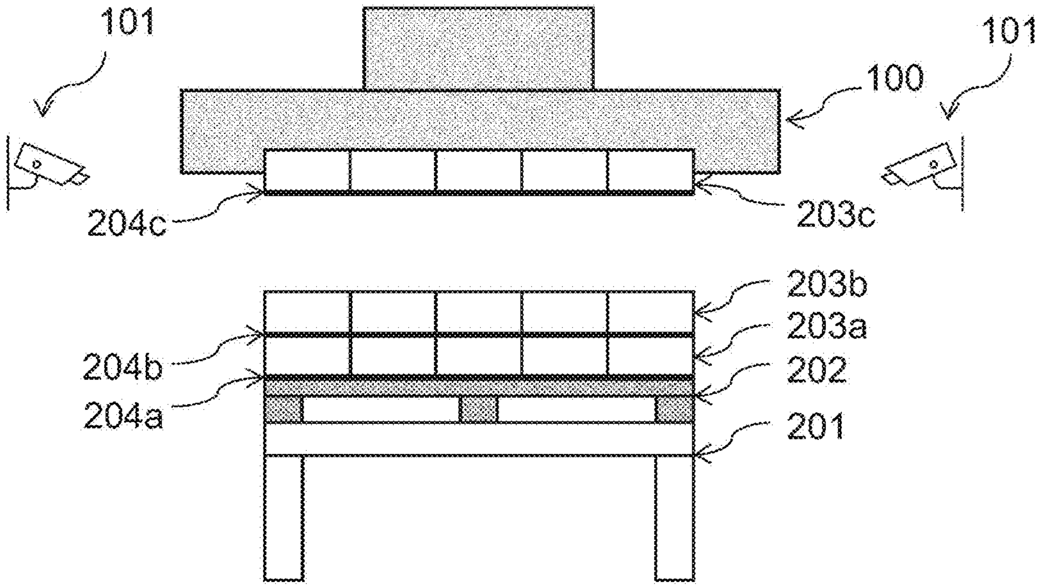
FIG. 5 is a schematic illustration of a material handling process of a material handling apparatus, wherein one layer of items is picked, in accordance with embodiments of the present disclosure.

FIG. 5 shows in principle the same as FIG. 4, wherein the material handling apparatus 100 is just in a handling process of handling one layer 203*c* of material 200. As can be seen from FIG. 5, there is no error in the handling process.

Figure 6:
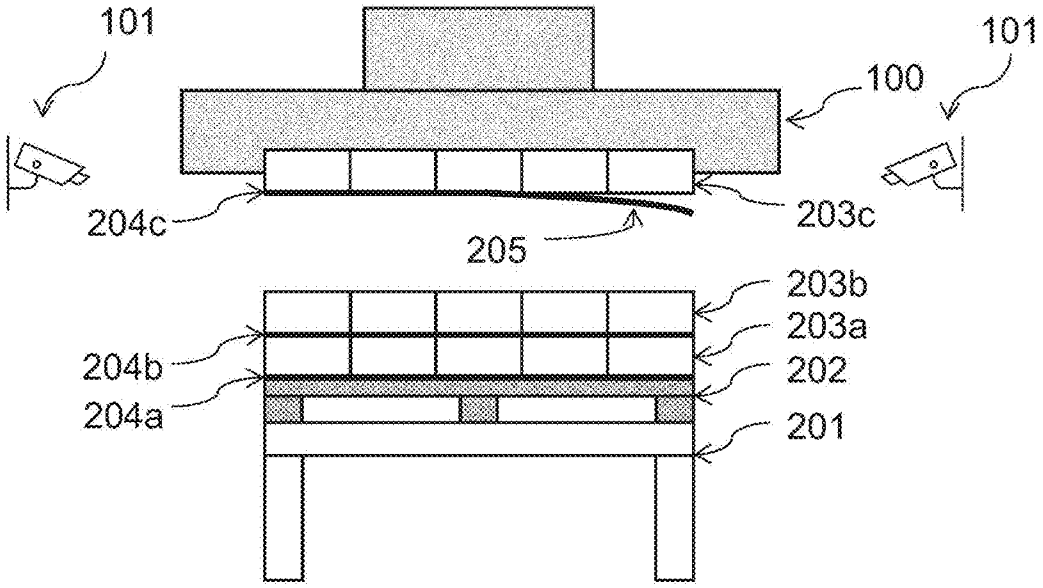
FIG. 6 is a schematic illustration of a material handling process of a material handling apparatus, wherein one layer of items is picked and an error occurs, in accordance with embodiments of the present disclosure.

In FIG. 6, however, there is an error 205. Here, the packaging material 204*c*, which in this case is a slip sheet, is partially detached from the underside of the handled layer 203*c* and hangs down. This defect is detected by a light sensor 103 of the material handling apparatus 100 by default. The light sensor 103 is not shown in FIG. 6 but is a standard element of many material handling apparatus 100 models implemented for safety. It shall be appreciated that the type of sensor is not decisive, but embodiments described herein are applicable to any type of sensor which is configured for detecting an error 205 in the handling process. Based on the error 205 detected by the light sensor 103, an alarm signal is generated. Without the implementation of the method described herein, the material handling apparatus 100 would interrupt the material handling process and a user 102 would have to continue it manually. In the worst case, a full reset of the material handling apparatus 100 would be necessary.

With the implementation of a method according to embodiments of the present disclosure, the material handling process is additionally or exclusively observed by at least one camera 101. Image data is recorded and a machine-learning model 402, 502 decides on the basis of the recorded images whether the alert signal was a false positive, i.e. whether an interruption of the material handling process is not necessary despite the presence of the alert signal and the material handling process may continue. The machine-learning model 402, 502 may override the alert signal and instruct the material handling apparatus 100 to continue the material handling process. An instruction to continue the material handling process may for example be an instruction to switch the material handling apparatus 100 into a temporary stop mode that allows a seamless continuation of the handling process, in particular with a reset of the material handling apparatus not being necessary, wherein the seamless continuation may for example be triggered by a user 102.

In the case shown in FIG. 6, only a part of packaging material 204*c* is hanging down causing the alert signal. The machine-learning model 402, 502 will receive the alert signal indicating an imminent interruption of the handling process and receive recorded image data from the cameras 101. The cameras are synchronized in order to minimize the risk of inconsistent image data. The recorded image data may comprise a sequence of still images, wherein only a subset of images is selected for further analyzing be the machine-learning model 402, 502. The selected subset of images may in particular comprise images recorded at predetermined times before and after receiving the alert signal. For appropriate selection of images, the alert signal and the images may each comprise a unique identifier and/or a time stamp that facilitates allocation.

Based on this information, the machine-learning model 402, 502 will perform an analyzing step for determining whether the alert signal is a false positive, i.e. whether the error 205 causing the alert signal is an error 205 which makes an interruption of the material handling process necessary or not. If, as it is apparent in the illustrated case of FIG. 6, it is not necessary to interrupt the material handling process, the machine-learning model 402, 502 will generate a control signal for instructing the material handling apparatus 100 to continue the material handling process.

Analyzing the image data may comprise determining a combined probability for the alert signal being a false positive based on sub-probabilities, wherein the sub-probabilities for the alert signal being a false positive are determined per camera. For determining the combined probability, the sub-probabilities may be weighted or averaged. Alternatively or additionally, the recorded images may be weighted. The combined probability may be compared with a first confidence threshold and a second confidence threshold, wherein the second confidence threshold is higher than the first confidence threshold. If the combined probability is above a first confidence threshold and is above a second confidence threshold, the machine-learning model 402, 502 may generate a control signal for instructing the material handling apparatus to continue the handling process If the combined probability is above a first confidence threshold but below the second confidence threshold, it is still highly likely that continuation of the handling process is possible without causing severe damages but in order to be on the safe side, the machine-learning model 402, 502 may generate a control signal for instructing the material handling apparatus 100 to switch the material handling apparatus 100 into a temporary stop mode that allows a seamless continuation of the process. Using thresholds is a particularly easy way of deciding whether a calculated probability for an error requiring an interruption of the handling process in fact should result in an interruption or whether the handling process should be continued. The thresholds may be predefined or dynamically managed by the machine-learning model 402, 502. In case of FIG. 6, the combined probability may be above the first confidence threshold and above the second confidence threshold. Thus, the machine-learning model 404, 502 will instruct the material handling apparatus 100 to continue the handling process.

Figure 7:
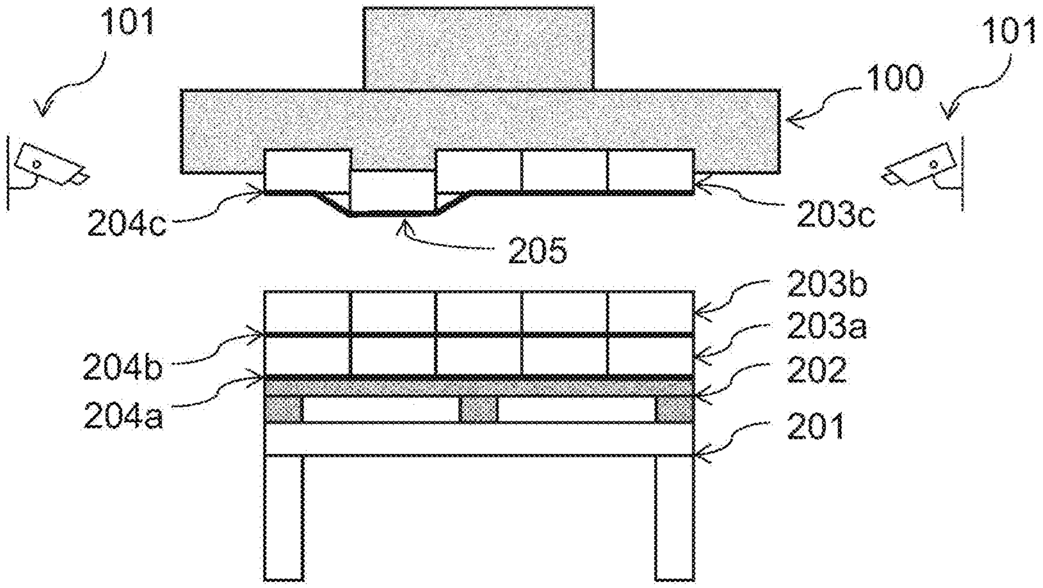
FIG. 7 is a schematic illustration of a material handling process of a material handling apparatus, wherein one layer of items is picked and an error occurs, in accordance with embodiments of the present disclosure.

In the situation illustrated in FIG. 7, a different error 205 is shown: One item of the layer 203*c* is moving down and may be dropped. In this case, the combined probability of the alert signal being a false positive may be above the first confidence threshold but below the second confidence threshold, such that the machine-learning model 402, 502 will instruct the material handling apparatus 100 to switch in a temporary stop mode. Or, it may also be the case, that the combined probability of the alert signal being a false positive may be below both of the thresholds, thus causing the machine-learning model 402, 502 to not override the alert signal, such that the material handling apparatus performs a full interruption of the handling process. After a full reset performed by a user 102, the material handling apparatus 100 may continue to handle material 200.

Figure 8:
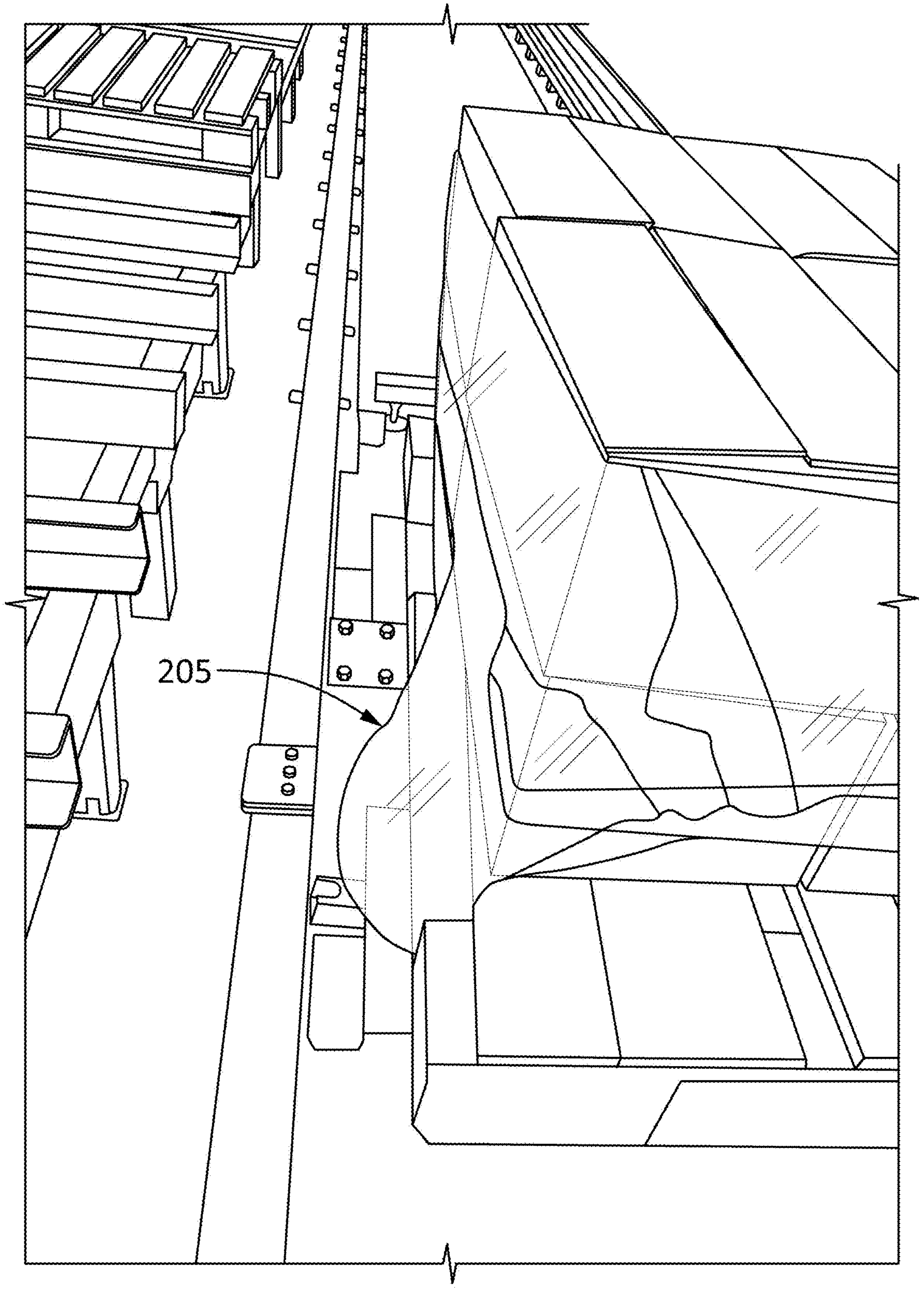
FIG. 8 is a first photo showing a packaging overhang in accordance with embodiments of the present disclosure.
Figure 9:
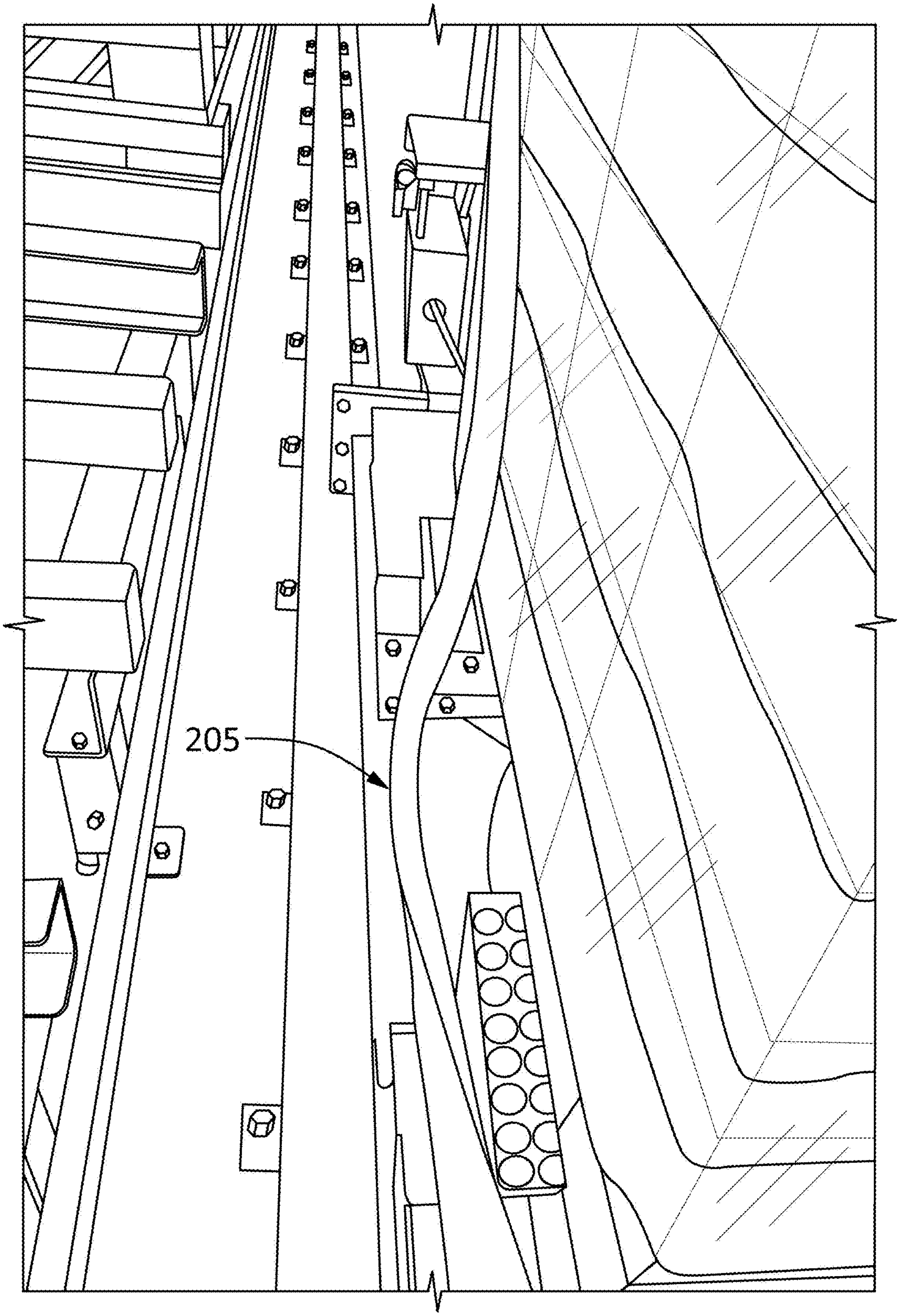
FIG. 9 is a second photo showing a packaging overhang in accordance with embodiments of the present disclosure.

FIGS. 8 and 9 show packaging materials, in this case plastic film, which is not properly wrapped around the items, has become loose or is sticking out for other reasons. This may be an error 205 in the sense of the present disclosure and may cause an alert signal as described above. In particular, an alert signal may occur during a handling process. The machine-learning model 402 may determine that the overhanging packaging material is not harmful and continue the handling process by overruling the alert signal, as described above.

Figure 10:
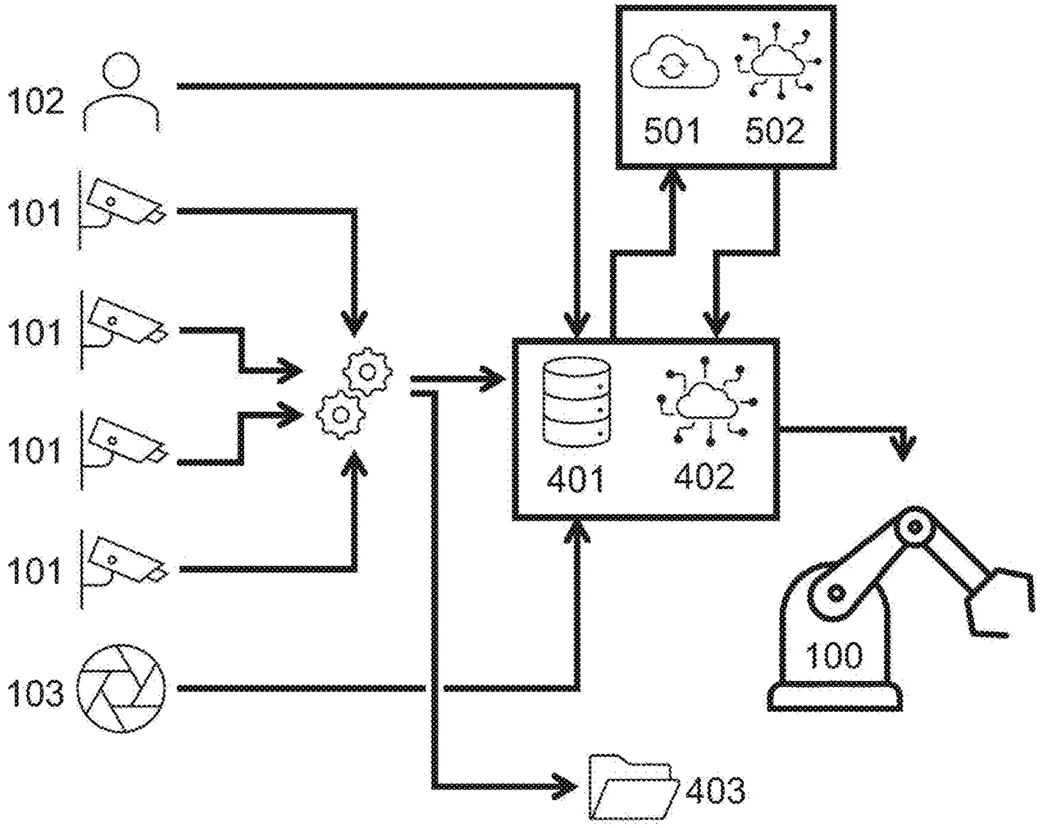
FIG. 10 is a component diagram corresponding to aspects of the present disclosure.

FIG. 10 is a component diagram showing elements of an embodiment of the present disclosure. A user 102, cameras 101 and a light sensor 103 are shown. Furthermore, a material handling apparatus 100 is shown schematically.

During material handling processes of the material handling apparatus 100, a local machine-learning model 402 on a local server 401 processes the image data from the cameras 101 and any alert signals from the light sensor 103. The image data is stored in a local file storage 403, for example for documentation purposes. Selected images are provided to the local machine-learning model 402. For example, every 15 ms, preferably by all four cameras 101 at the same time, a still image is provided. It is also possible to only provide a minimal subset of images in order to facilitate faster processing. For example, if an alert signal occurs at image number 20, images number 18, 20, 22 and 24 may be provided. As described above, the local machine-learning model 402 makes decisions about whether the handling process should be continued or not.

Further, at the same time, the development of the machine-learning model 402, 502 can always take place. For this purpose, there is a remote machine-learning model 502 provided, which is stored on a remote server 501. While working with the material handling apparatus 100, user inputs from the user 102, image data from the cameras 101 and alert signals from the light sensor 103 are transferred to the remote machine-learning model 502. The remote machine-learning model 502 is trained on the remote server 501 and the local machine-learning model 402 is updated at regular intervals as part of a synchronization process.

Figure 11:
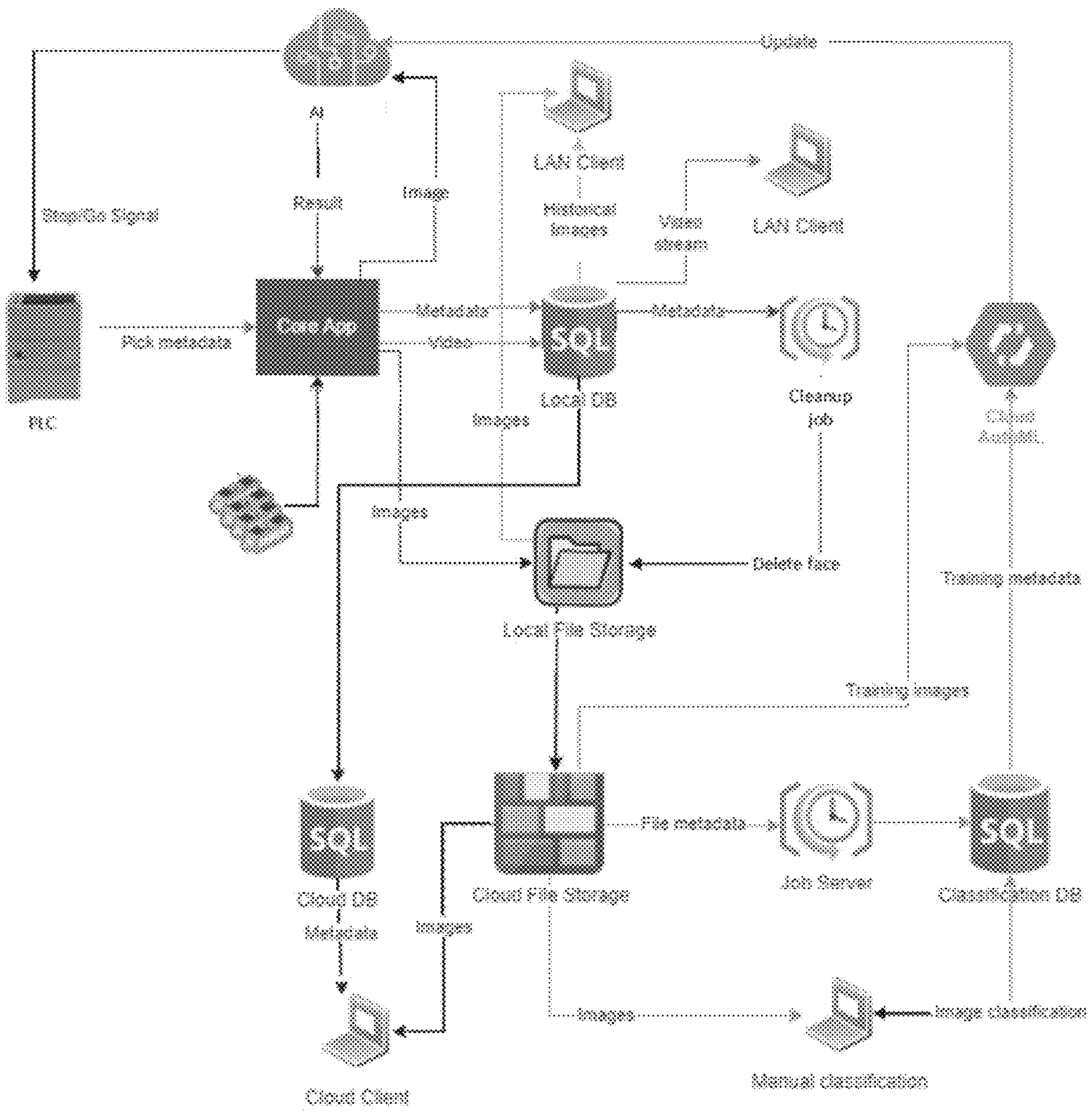
FIG. 11 is a component diagram according to one exemplary embodiment of the present disclosure.
Figure 12:
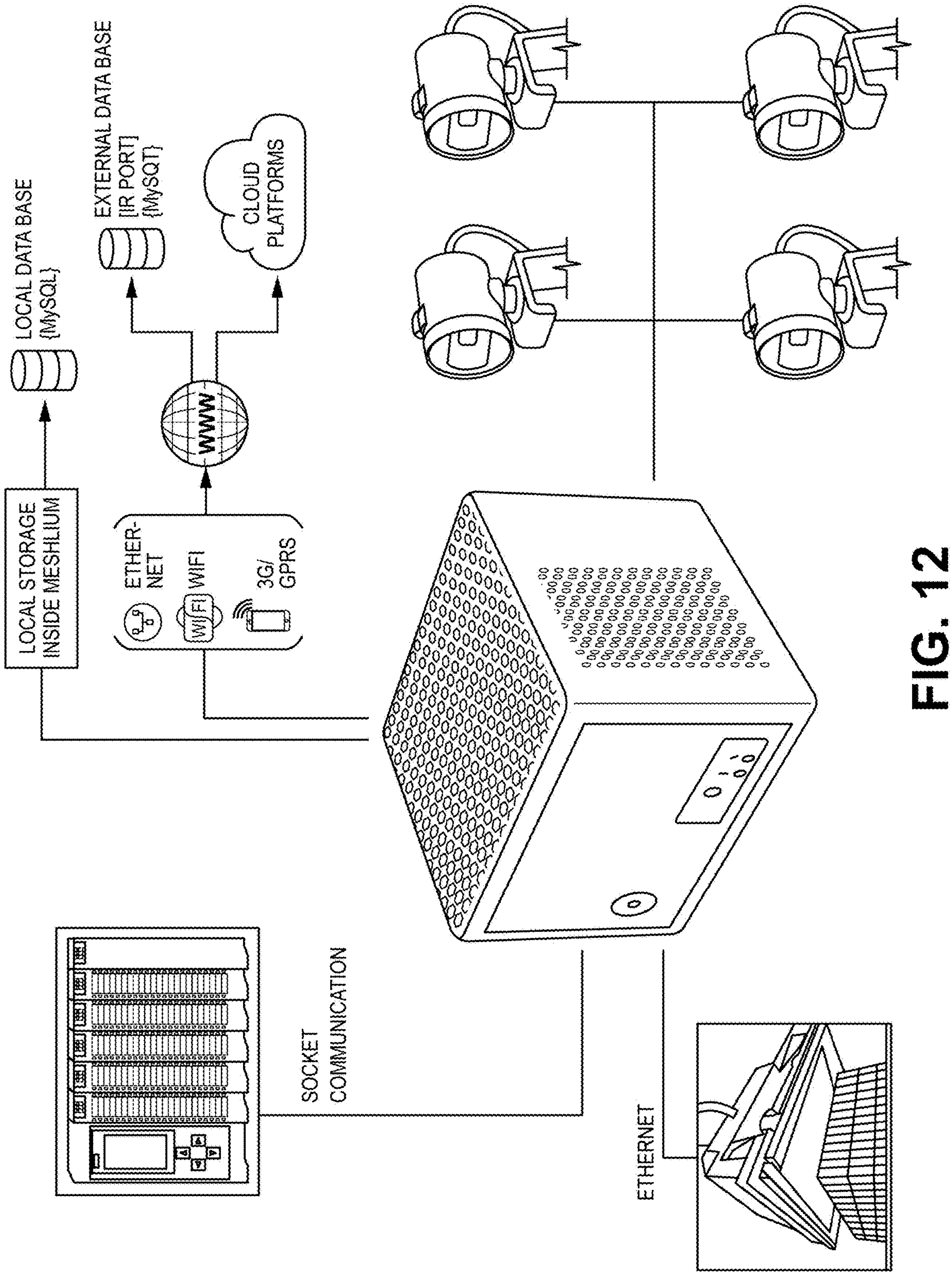
FIG. 12 is a component diagram showing aspects of one exemplary embodiment of the present disclosure.

FIG. 11 shows a component diagram according to one exemplary embodiment of the present disclosure. FIG. 12 shows a further component diagram showing aspects of one exemplary embodiment of the present disclosure.

Embodiments described herein may be implemented in conjunction with layer pickers, cranes, Automatic Guided Vehicles (AGVs), Laser Guided Vehicles (LGVs), Rail Guided Vehicles (AGVs) and T-Cars. Thus, all these may be material handling apparatuses in the sense of the present disclosure.

Figure 13:
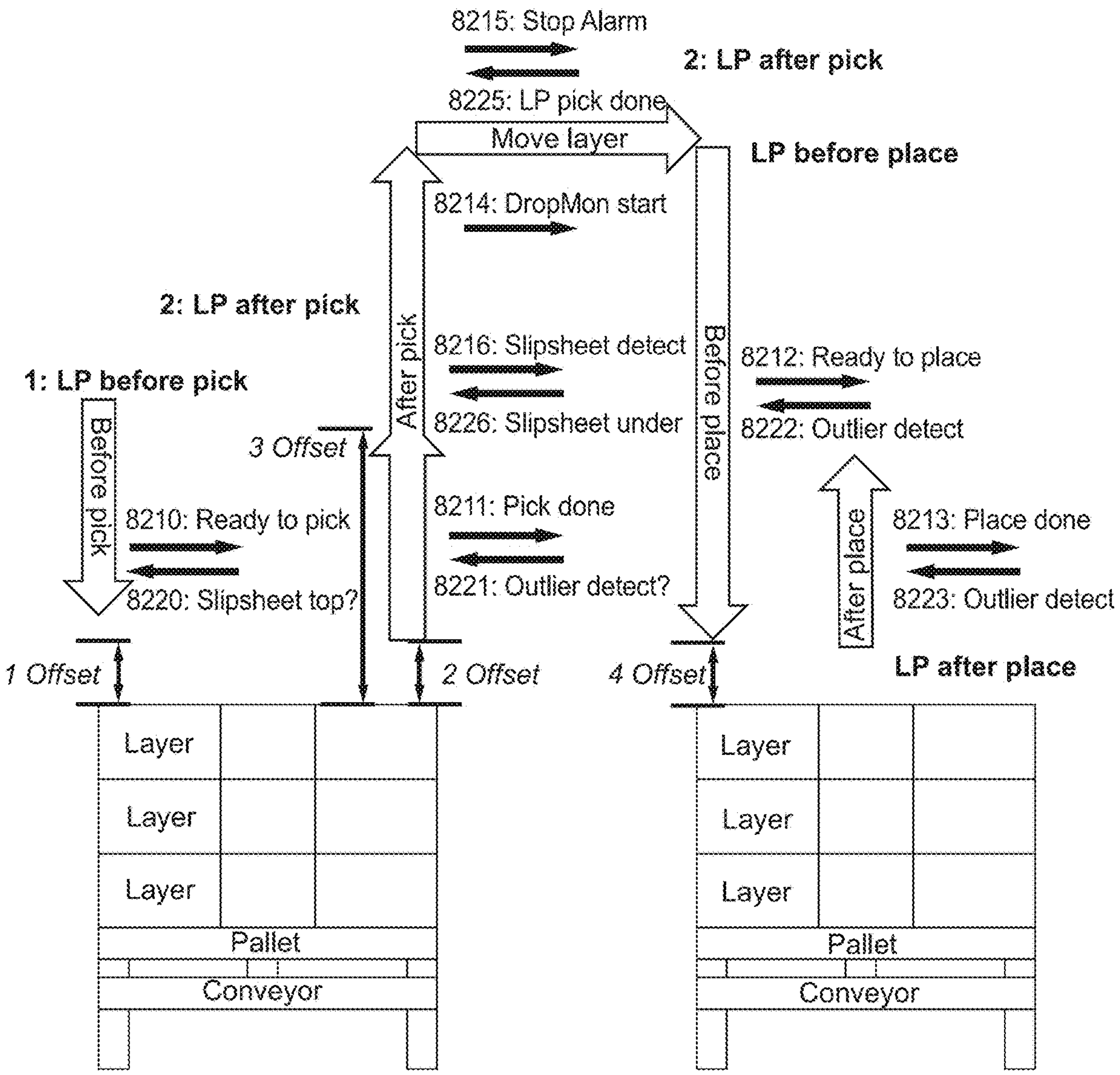
FIG. 13 is a schematic overview of a possible handling process in an exemplary embodiment of the present disclosure.

FIG. 13 provides a schematic overview of a possible handling process in an exemplary embodiment of the present disclosure. The following table provides further aspects, in particular telegram codes and their meaning during the exemplary handling process shown in FIG. 13:

| Pos. | Telegram No. | Flow Chart | Explanation & Destination |
|---|---|---|---|
| 10200-10300 | 8210 | | PLC -> AI-BOX: LP ready to pick |
| | 8220 | | AI-BOX -> Slipsheet detection at pick (Slipshet on top) |
| | 8211 | | PLC -> AI-BOX: LP pick done - check outline |
| | 8221 | | AI-BOX -> Outline detection after pick |
| | 8216 | | PLC -> AI-BOX: LP ready to pick |
| | 8226 | | AI-BOX -> Slipsheet detection at pick (Slipshet under) |
| | 8212 | | PLC -> AI-BOX: LP ready to place - check outline |
| | 8222 | | AI-BOX -> PLC Outliner detection, destination-position |
| | 8213 | | PLC -> AI-BOX: LP place done |
| | 8223 | | AI-BOX -> PLC Outliner detection, destination-position |
| | 8214 | | PLC -> AI-BOX: LP start drop monitor |
| | 8224 | | AI-BOX -> PLC: Reply drop monitor |
| | 8215 | | PLC -> AI-BOX: LP stop Alarm drop monitor |
| | 8225 | | AI-BOX -> PLC LP Drop monitoring status |
| | 8235 | | PLC -> AI-BOX: LP operator selection |
| | 8245 | | AI-BOX -> PLC: ACK 8235 |

In the following, exemplary implementations of the present disclosure are described on a more detailed level. A first exemplary implementation may be related to the training phase of the machine-learning model:

1. The material handling apparatus sends a telegram 8215 layer is dropped with a UNIQ-ID.
2. The exemplary embodiment creates a video sequence 2 sec. before to 2 sec. after. In total, 4 sec. are included. This video is saved with the UNIQ-ID and other meta data (Pick Program, Pick position, Deliver position, product, Dimensions, and the like).
3. The exemplary embodiment is now in a waiting position. It waits for the learning input from the operator.
4. The operator takes one or more of multiple decisions:
   a. Continue process Reset (On HMI)
   b. Continue Override Drop sensor (On HMI)
   c. Door Open (classification invalid/STOP)
   d. Manual released (On HMI) (classification Invalid/STOP)
5. When operator decision is done, the PLC sends a 8235 with the UNIQ-ID (This is used to ensure valid data) the operator decision received is now saved together with the video in the database (also referred to as the video classification).
6. The material handling apparatus is not running, the operator did not see the above steps, it happens in the background
7. The data is uploaded to cloud where the training is done.
   Google Auto ML may be used as a training model. It may return a binary file that can be run on a local PC. Facial recognition and anonymization before sending data to the cloud to be GDPR compliant may be performed.
8. After that sufficient data from the site is collected, automatic training of the classifications done by the operator may be performed, meaning that the operator classifies the data. It will be checked, if the door is open.

After stabile models are achieved, the pretrained model can be run on the invalid data and by that they can be moved to the right classes.

A second exemplary implementation may be related to autonomous operation of the material handling apparatus:

1. The exemplary embodiment sends a telegram 8215 that the layer is dropped with a UNIQ-ID.
2. The exemplary embodiment creates a video sequence 2 sec. before to 2 sec. after. This included thus a total time period of 4 sec. This video is saved with the UNIQ-ID and other meta data (Pick Program, Pick position, Deliver position, product, Dimensions Among more).
3. The exemplary embodiment then activates the code checking the video, e.g. written in "go". In general, the video sequence can be checked in many ways. It may for example be done by analyzing every picture one by one, and by every camera. Then the overall result may be assessed. In testing it was found out that only pictures 18-20-22-24 are needed in one embodiment to get sufficient information about the process.
4. When the video assessed by the machine-learning model is a telegram from the Operator AI sent to the PLC, this telegram receives the UNIQ-ID for the drop to ensure that we reset the correct drop and not an old one. The signal sent is STOP/CONTINUE. This could also be done with a binary signal TRUE/FALSE.
5. The PLC receives the signal, if the UNIQ-ID is correct and the result is CONTINUE will the machine continue automatically and recover from the fault without any operator interaction making it autonomous.

In the following, experimental results are provided, wherein a layer picker is operated with one embodiment of the method according to the present disclosure. The method is implemented such as a combined probability for the alert signal being a false positive is determined, as described above. Further, a confidence threshold is defined, wherein if the combined probability is above the confidence threshold, a control signal for instructing the layer picker to continue the handling process is performed. The trained machine-learning model for the experiments is derived from a layer picker installed in early October 2021. In total, 68 GB and 2.1 million files are collected until January 2022, wherein 122.000 images and 56.000 image sequences were classified.

In a first experiment, the confidence threshold is set to 90%. This means, literally speaking, if an alert signal occurs, a control signal instructing the layer picker to continue the handling process is only generated if the machine-learning model determines that the combined probability that the alert signal is a false positive, is above 90%. The experiment had a duration of 30 days of regular operation and included approximately 1900 alert signals during handling processes. The machine-learning model determined in 716 cases, which is equal to approximately 37% of all alert signals, that the combined probability is above the confidence threshold of 90%. Thus, in 37% of the cases, a control signal instructing the layer picker to continue the handling process was generated. The total saved hot downtime is approximately 1432 minutes, calculated based on an average hot downtime of 2 minutes per stop of the layer picker.

In a second experiment, the confidence threshold is set to 80%. Analogous to the first experiment, the second experiment also had a duration of 30 days of regular operation and included approximately 1900 alert signals during handling processes. The machine-learning model determined in 761 cases, which is equal to approximately 40% of all alert signals, that the combined probability is above the confidence threshold of 80%. Thus, in 40% of the cases, a control signal instructing the layer picker to continue the handling process was generated. The total saved hot downtime is approximately 1522 minutes, calculated based on an average hot downtime of 2 minutes per stop of the layer picker.

As it can be seen from the experiments, a 10% higher detection failure risk only provides an improvement of 3% with respect to saved hot downtimes. Therefore, it is a valid option to define a first confidence threshold and a second confidence threshold, wherein the second confidence threshold may be higher than the first confidence threshold, such that if the combined probability for the alert signal being a false positive is above the first confidence threshold but below the second confidence threshold, there could be a more serious error that requires a check by a user in order to be on the safe side. The first confidence threshold may be set to 80% and the second confidence threshold may be set to 90%.

Very good results are to be expected based on the described configuration and the introduction of a temporary stop mode, as follows: In case the combined probability is above a first confidence threshold and is above a second confidence threshold, generating a control signal for instructing the material handling apparatus to continue the handling process may be performed. In case if the combined probability is above a first confidence threshold but below the second confidence threshold, generating a control signal for instructing the material handling apparatus to switch into a temporary stop mode that allows a seamless continuation of the process may be performed.

An exemplary hardware setup usable in embodiments described herein may include:

Fanless Embedded Box-PC:
- Slim Embedded System
- Intel® Core™ i5-5350U Processor (Broadwell-U)
- 6 GbE LAN with 4 PoE+, 4 COM, 6 USB, Isolated DIO
- 257×141×48 mm
- 6-36 VDC
- PC connected to Cable, and trough proper Firewall routing
- without PS Camera(s):
- DALSA GENIE NANO-C2020 POE
- Wide angle linse S-Mount lens for sensor max. 1/1.8"—max. 5 Megapixel
- Focal length 2.95 mm In the following, implementation details are disclosed with respect to exemplary embodiments of the present disclosure.

A job server may be used to host all scheduled jobs in a cloud. For example, it may only execute one job every 10 minutes that will run through all files that were generated in the file storage for the current day and insert the paths of these files into the classification database. This ensures "galvanic protection" as there is no additional information attached to the images, only their content and file names.

A classification database may be used to hold classifications performed by the manual classification operators. It may also track which operator has performed how many classifications, the individual classification verdict as well as calculations on the financial compensation for the operators. The database may also be able to generate a CSV file with the verdict that AutoML can read into a dataset.

Google's AutoML "Single label classification" may be used as a cloud path for the images generated in the CSV files. They may be imported into a dataset.

When the CoreApp inserts for example an 8215 record in the database, an AI Sequence Inference may be called. It may grab the metadata from the database and the image files for that sequence from the file system. It then takes the images from the 4 cameras, for 4 frames (18,20,22,24), in total 16 images, and invokes a Rest API call to On-Prem AI.

This returns the verdict for the 16 images. The AI Sequence inference then takes the average over the 4 frames for each camera and updates the database with the average verdicts. It then calculates the total average and compares that to the threshold defined in the configuration file for the program. If the score is bigger than the configured threshold, it will send a message telegram over TCP to the PLC, port 10100 (Also configured in the config file). The telegram contains CONT for continue or STOP for stop. The PLC replies back with the same record to verify the receipt of the telegram. The events of accessing the file system, the verdict, and the PLC communication are logged, as well as any errors.

There may be one script for sequences (8215) and one for images (8210). Both of them look in the database for picks whose images have not yet been uploaded to cloud. It generates a list of these images, finds each image in the file system, and checks for faces in the images. If faces are found, the images are physically replaced with a black image with the text "FACE DETECTED—IMAGE IS VOID". After, and ONLY after, the face detection has run, the images will be uploaded to the cloud file storage and the database is updated with the information that the file has been uploaded. For 8215, an .avi video file is made and uploaded. It is made only after face detection is completed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments described herein can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

REFERENCE SIGNS

- 100 material handling apparatus
- 101 camera
- 102 user
- 103 light sensor
- 200 material
- 201 conveyor
- 202 pallet
- 203*a*-203*c* layers
- 204*a*-204*c* packaging material
- 205 error
- 300 hoist crane
- 401 local server
- 402 machine-learning model on local server
- 403 local file storage
- 501 remote server
- 502 machine-learning model on remote server

The invention claimed is:

1. A computer-implemented method of operating a material handling apparatus, comprising:
   - while the material handling apparatus is performing a handling process, receiving an alert signal indicating an imminent interruption of the handling process;
   - analyzing, using a machine-learning model, recorded image data of the handling process;
   - determining, using the machine-learning model, that the alert signal is a false positive, wherein the step of determining that the alert signal is a false positive comprises:
     - generating sub-probabilities for the alert signal being a false positive per camera; and
     - determining a combined probability for the alert signal being a false positive based on the sub-probabilities; and
   - generating a control signal for instructing the material handling apparatus to continue the handling process.

2. The method of claim 1, wherein the image data comprises a sequence of still images, wherein the step of analyzing comprises selecting a subset of images, and wherein the selected subset of images comprises images recorded at predetermined times occurring one or more of before and after receiving the alert signal, and wherein the images comprise one or more of a unique identifier and a time stamp.

3. The method of claim 1, wherein the image data comprises images recorded by at least two cameras, wherein the at least two cameras are synchronized with respect to the time at which the image data is recorded.

4. The method of claim 1, wherein generating the sub-probabilities comprises weighting of recorded images, and wherein determining the combined probability comprises averaging of the sub-probabilities and weighting of the sub-probabilities.

5. The method of claim 1, wherein if the combined probability is above a first confidence threshold and is above a second confidence threshold, generating a control signal for instructing the material handling apparatus to continue the handling process is performed.

6. The method of one of claim 1, wherein the alert signal comprises one or more of a unique identifier and a time stamp.

7. A computer program comprising instructions which, when the program is executed by a computer, cause the computer to carry out the method of claim 1.

8. The method of claim 1, wherein generating the sub-probabilities comprises weighting of recorded images, or wherein determining the combined probability comprises one or more of averaging of the sub-probabilities and weighting of the sub-probabilities.

9. The method of claim 1, wherein if the combined probability is above a first confidence threshold but below the second confidence threshold, generating a control signal for instructing the material handling apparatus to switch into a temporary stop mode that allows a seamless continuation of the process is performed.

10. A computer-implemented method for generating training data for a machine-learning model for operating a material handling apparatus, comprising:
    - while the material handling apparatus is performing a handling process, receiving an alert signal indicating an imminent interruption of the handling process;
    - receiving user input from a user indicating a reaction to the alert signal, and including an instruction to continue the handling process in case the alert signal is determined to be a false positive;
    - obtaining recorded image data of the handling process; and generating a training dataset comprising the user input and the image data, wherein, if the user input comprises manually controlling the material handling apparatus or if the user input comprises opening the safety barrier surrounding the material handling apparatus, the respective user input and image data is excluded from the training dataset.

11. The method of claim 10, wherein the user input comprises at least one of the following: an instruction to one or more of continue the handling process and disregard the alert signal; an instruction to reset the material handling apparatus; an instruction to switch the material handling apparatus into a manual control mode allowing the user to manually control the material handling apparatus; and opening a safety barrier surrounding the material handling apparatus.

12. A machine-learning training dataset obtained by a method for generating training data for a machine-learning model according to claim 10.

13. A material handling apparatus comprising one or more of a local server, a remote server, and a controller that are operable to execute instructions for:

while the material handling apparatus is performing a handling process, receiving an alert signal indicating an imminent interruption of the handling process;

analyzing, using a machine-learning model, recorded image data of the handling process;

determining, using the machine-learning model, that the alert signal is a false positive, wherein determining that the alert signal is a false positive comprises:

generating sub-probabilities for the alert signal being a false positive per camera; and determining a combined probability for the alert signal being a false positive based on the sub-probabilities; and generating a control signal for instructing the material handling apparatus to continue the handling process.

14. The material handling apparatus of claim 13 comprising a layer picker apparatus that includes four cameras, wherein the cameras are synchronized with respect to the time at which the image data is recorded, and wherein the analyzing comprises selecting a subset of images being recorded at predetermined times occurring one or more of before and after receiving an alert signal.

* * * * *